US012709052B2

(12) United States Patent
Yamamoto

(10) Patent No.: US 12,709,052 B2
(45) Date of Patent: Aug. 18, 2026

(54) LAMINATING MOLDING SYSTEM AND LAMINATING MOLDING METHOD

(71) Applicant: THE JAPAN STEEL WORKS, LTD., Tokyo (JP)

(72) Inventor: Takayuki Yamamoto, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 17 days.

(21) Appl. No.: 18/841,382

(22) PCT Filed: Jan. 17, 2023

(86) PCT No.: PCT/JP2023/001205
§ 371 (c)(1),
(2) Date: Aug. 25, 2024

(87) PCT Pub. No.: WO2023/176130
PCT Pub. Date: Sep. 21, 2023

(65) Prior Publication Data

US 2025/0187252 A1 Jun. 12, 2025

(30) Foreign Application Priority Data

Mar. 16, 2022 (JP) ................................ 2022-041420

(51) Int. Cl.
*B29C 51/16* (2006.01)
*B29C 51/10* (2006.01)
*B29C 51/26* (2006.01)

(52) U.S. Cl.
CPC ............ *B29C 51/167* (2013.01); *B29C 51/10* (2013.01); *B29C 51/261* (2013.01)

(58) Field of Classification Search
CPC .................................................... B29C 43/203
See application file for complete search history.

(56) References Cited

U.S. PATENT DOCUMENTS 6,041,840 A * 3/2000 Ogawa ................ B32B 37/1018
156/382
2012/0211928 A1 8/2012 Takai et al.

FOREIGN PATENT DOCUMENTS

JP H10-315257 A 12/1998
JP 2000-141389 A 5/2000
(Continued)

OTHER PUBLICATIONS

International Search Report for International Patent Application No. PCT/JP2023/001205, Feb. 28, 2023.
(Continued)

*Primary Examiner* — Virak Nguon
(74) *Attorney, Agent, or Firm* — Potomac Law Group, PLLC

(57) ABSTRACT

A laminate molding system (11) in which an article to be laminated-molded (A) is carried into a laminating apparatus from one side thereof (12) by using a carrier film (F1, F2), and after the article (A) is laminated-molded in the laminating apparatus (12), the laminated-molded article (A) is carried out of out the laminating apparatus from another side thereof (12), in which drooping prevention mechanisms (18*a,* 18*b*) for preventing the carrier film (F1) and the laminated-molded article (A) from drooping at a molding position (12*a*) of the laminating apparatus (12) are respectively provided at an outer-side nearby position on a carry-in side with respect to the molding position (12*a*) of the laminating apparatus (12) and an outer-side nearby position on the carry-out side with respect to the molding position (12*a*) of the laminating apparatus (12). In this way, a laminating molding system and a laminating molding method capable of alleviating a problem in regard to the occurrence of defective molding caused by the drooping of a carrier film in a laminating apparatus are provided.

9 Claims, 4 Drawing Sheets

(56) References Cited

FOREIGN PATENT DOCUMENTS

| | | | | |
|---|---|---|---|---|
| JP | 2002-120100 | A | 4/2002 | |
| JP | 5193198 | B2 * | 5/2013 | ............... B30B 7/02 |
| JP | 2014-18984 | A | 2/2014 | |
| JP | 2014-031226 | A | 2/2014 | |
| JP | 2020-097231 | A | 6/2020 | |
| JP | 7025499 | B1 | 2/2022 | |
| TW | 200906606 | A | 2/2009 | |
| WO | WO-2014192456 | A1 * | 12/2014 | ............. B29C 43/18 |
| WO | 2017/010319 | A1 | 1/2017 | |

OTHER PUBLICATIONS

Office Action issued Feb. 3, 2026, in Japanese Patent Application No. 2022-041420.

Office Action issued Apr. 30, 2026, in Taiwanese Patent Application No. 112105476.

* cited by examiner

| Process / Apparatus | Film Conveyance Process Pa | Chamber Closing Process Pb | | Laminating Molding Process Pc | Chamber Opening Process Pd | | Film Conveyance Process Pa |
|---|---|---|---|---|---|---|---|
| Drooping Prevention Mechanism | Opened Position (Stop) | Closing Operation | Closed Position | Closed Position | Closed Position | Opening Operation | Opened Position (Stop) |
| Carrier Film Conveyance Apparatus | Conveyance of Film | Stop (Tension is given) | | Stop (Tension is given) | Stop (Tension is given) | | Conveyance of Film |
| Laminating Apparatus | Opened Position (Stop) | Chamber is closed | | Laminating Molding | Chamber is opened | | Opened Position (Stop) |

Fig. 4

LAMINATING MOLDING SYSTEM AND LAMINATING MOLDING METHOD

TECHNICAL FIELD

The present invention relates to a laminating molding system and a laminating molding method in which an article to be laminated-molded is carried into a laminating apparatus from one side thereof by using a carrier film, and after the article is laminated-molded in the laminating apparatus, the laminated-molded article is carried out of out the laminating apparatus from the other side thereof.

BACKGROUND ART

Regarding such a laminating molding system and a laminating molding method in which an article to be laminated-molded is carried in from an entry port on one side of a laminating apparatus by using a carrier film, and after the article is laminated-molded in the laminating apparatus, the laminated-molded article is carried out from an exit port on the other side of the laminating apparatus, one disclosed in Patent Literature 1 has been known. In Patent Literature 1, a chuck conveyance apparatus 25 for conveying a continuous film-like carrier 6 supporting a product 4', in which a material to be laminated 4 and a lamination material (5) supported by a film-like support 5 are laminated, in a direction indicated by an arrow X in FIG. 1 is provided between a vacuum laminator 1, which is a laminating apparatus, and a flattening press machine 2, which is also a laminating apparatus.

CITATION LIST

Patent Literature

Patent Literature 1: Japanese Unexamined Patent Application Publication No. 2002-120100

SUMMARY OF INVENTION

However, regarding the aforementioned Patent Literature 1, the chuck conveyance apparatus is provided in a process subsequent to the vacuum laminating apparatus of the laminating apparatus as shown in FIG. 1, or is provided in a process subsequent to a flattening pressing apparatus of the laminating apparatus as shown in FIG. 2. Therefore, since the chuck apparatus is used only when the laminated-molded article is conveyed, the following problem occur in some cases. That is, when the weight of the product is small, the carrier film used for the conveyance (especially the lower carrier film) hardly droops due to the weight of the laminated-molded article. However, as the weight of the laminated-molded article increases, a problem arises that the lower carrier film over which the laminated-molded article is placed droops. Further, in particular, after the laminated-molded article composed of the material to be laminated and the lamination material, for which the molding has not been started yet, is carried in, if the lower carrier film droops at the molding position in the laminating apparatus and comes into contact with a heated heat plate on a lower board side before the start of the pressurization, the heat conduction is accelerated, for example, only from one side before the other side, and defects are thereby caused in many cases.

In order to cope with the above-described problem, it is conceivable to increase the tension of the carrier film. However, in order to increase the tension of the carrier film, it is necessary to change the carrier film to one that is thicker and stronger. Such a thick carrier film is expensive and sometimes has an adverse effect on the molding because of its large thickness. Further, in order to increase the tension of the carrier film, it is necessary to improve the ability of the motor of the carrier film conveyance apparatus and the strength of the carrier film conveyance apparatus, leading to an increase in the cost of the apparatus. Therefore, an object of the present invention is to provide a laminating molding system and a laminating molding method capable of alleviating a problem in regard to the occurrence of defective molding caused by the drooping of a carrier film in a laminating apparatus. Other problems to be solved and novel features will become apparent from the descriptions in this specification and accompanying drawings.

In a laminate molding system according to an embodiment, an article to be laminated-molded is carried into a laminating apparatus from one side thereof by using a carrier film, and after the article is laminated-molded in the laminating apparatus, the laminated-molded article is carried out of out the laminating apparatus from another side thereof, in which drooping prevention mechanisms for preventing the carrier film and the laminated-molded article from drooping at a molding position of the laminating apparatus are respectively provided at an outer-side nearby position on a carry-in side with respect to the molding position of the laminating apparatus and an outer-side nearby position on the carry-out side with respect to the molding position of the laminating apparatus.

According to an embodiment, it is possible to alleviate a problem in regard to the occurrence of defective molding caused by the drooping of a carrier film in a laminating apparatus.

BRIEF DESCRIPTION OF DRAWINGS

FIG. 4 is an explanatory table showing operations performed by the laminating molding system according to the first embodiment;

DESCRIPTION OF EMBODIMENTS

Figure 1:
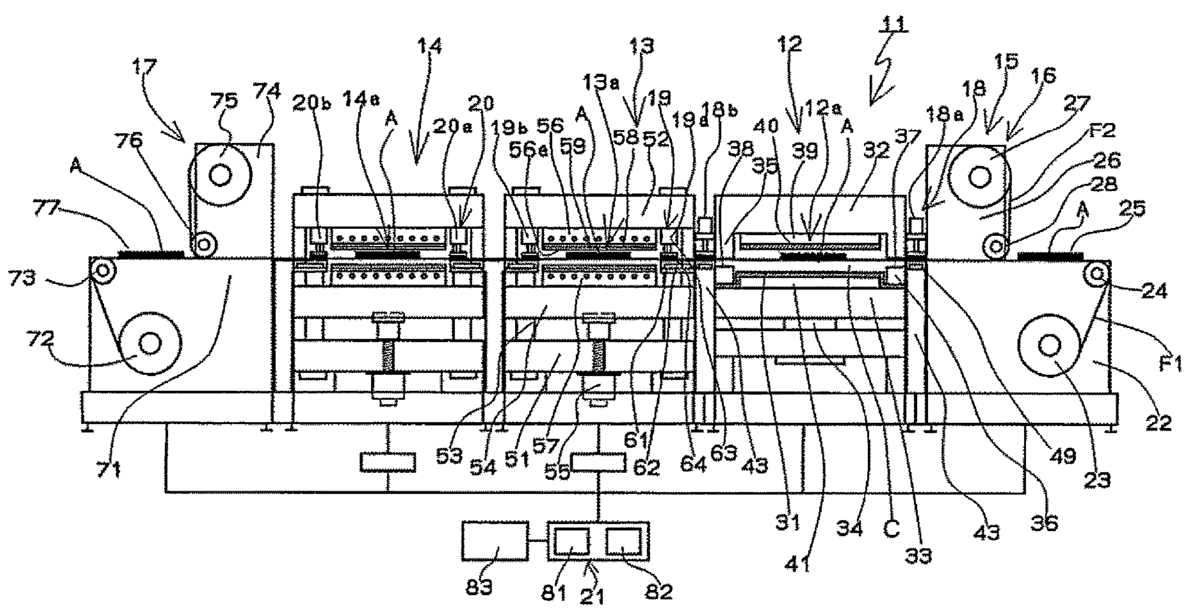
FIG. 1 is a schematic side view of a laminating molding system according to a first embodiment.

A laminating molding system 11 according to a first embodiment of the present invention will be described with reference to FIGS. 1 and 2, in which some parts of a vacuum laminating apparatus 12, which is a laminating apparatus, a first pressing apparatus 13, and a second pressing apparatus 14 are shown in cross section. In the laminating molding system 11, two pressing apparatuses 13 and 14, i.e., the first and second pressing apparatuses 13 and 14, are provided in a row in a process subsequent to the vacuum laminating apparatus 12. Further, in the laminating molding system 11, a carrier film sending apparatus 16, which is one of carrier film conveyance apparatuses 15, is provided in a process preceding the vacuum laminating apparatus 12, and a carrier film winding apparatus 17 is provided in a process subsequent to the second pressing apparatus 14.

Further, in the present invention, drooping prevention mechanisms 18, 19 and 20 for preventing carrier films F1 and F2 (in particular, the lower carrier film F1) and a laminated-molded article A from drooping at the molding position of the laminating apparatus are provided, in the vacuum laminating apparatus 12, which is the laminating molding apparatus, the first pressing apparatus 13, and the second pressing apparatus 14, respectively, at an outer-side nearby position on the carry-in side with respect to the molding position of the laminating apparatus and at an outer-side nearby position on the carry-out side with respect to the molding position of the laminating apparatus. Note that the drooping prevention mechanisms 18, 19 and 20 are essential apparatuses in the vacuum laminating apparatus 12, which performs the first laminating molding, and are optionally provided as required in the other apparatuses, i.e., the first and second pressing apparatuses 13 and 14. Further, the laminating molding system 11 includes a control apparatus 21. The control apparatus 21 is connected to the vacuum laminating apparatus 12, the first pressing apparatus 13, the second pressing apparatus 14, the carrier film sending apparatus 16 of the carrier film conveyance apparatuses 15, the carrier film winding apparatus 17, and the drooping prevention mechanisms 18, 19 and 20, and controls the whole laminating molding system 11.

Next, the apparatuses constituting the laminating molding system will be described one by one from the preceding process side. The carrier film sending apparatus 16 of the carrier film conveyance apparatuses 15 serves as both a transfer apparatus for a laminated-molded article A, which is composed of a substrate having irregularities and a lamination film that is disposed over (i.e., covers) the substrate so as to be in contact with at least one surface of the substrate, and a tension apparatus for the film. A lower body part 22 of the carrier film sending apparatus 16 includes a lower unwinding roll 23 and a driven roller 24. The direction of a lower carrier film F1 unwound from the lower unwinding roll 23 is changed to a horizontal state at the driven roller 24. A placement stage part 25 over which a laminated-molded article A composed of a substrate and a lamination film, which are disposed one over the other and sent from the preceding process, is provided at the part where the lower carrier film F1 becomes the horizontal state. Further, an upper body part 26 of the carrier film sending apparatus 16 includes an upper unwinding roll 27 and a driven roller 28. Further, an upper carrier film F2 unwound from the upper unwinding roll 27 is disposed over a laminated-molded article A3 composed of a substrate and a lamination film A2 at the driven roller 28. The laminated-molded article A is transferred while being sandwiched between the carrier films F1 and F2. Note that in the description of this embodiment, the materials before the laminating molding, the semi-finished product during the laminating molding, and the finished product after the laminating molding are all referred to as the laminated-molded article A. Further, the carrier films F1 and F2 prevent the lamination film from being melted and adhering to the apparatus or the like when the laminating molding is performed through the carrier films F1 and F2 in the vacuum laminating apparatus 12, the first pressing apparatus 13, and the second pressing apparatus 14. Further, the use of the carrier films F1 and F2 has another advantage that they provide a certain buffer function when the laminated-molded article is pressurized in, in particular, the first and second pressing apparatuses 13 and 14.

Next, the vacuum laminating apparatus 12 disposed in the process subsequent to the carrier film sending apparatus 16 will be described. The vacuum laminating apparatus 12, which is a type of laminating apparatus, pressurizes the laminated-molded article A composed of the substrate and the lamination film by a pressurizing body such as a diaphragm 31 at a molding position 12*a* (molding area) inside a chamber C which is in a vacuum state, and thereby laminating-molds the primarily-molded (i.e., preliminarily-molded) laminated-molded article A. In the vacuum laminating apparatus 12, a lower board 33 is provided in such a manner that it can be moved up and down by an elevating mechanism 34 relative to a fixedly-provided upper board 32. The upper board 32 includes an outer frame part 35. Further, the lower board 33 includes an outer frame part 36. Further, as the lower board 33 is raised and the outer frame part 36 of the lower board 33 comes into contact with the outer frame part 35 of the upper board 32, a chamber C can be formed inside them. Further, on one side of the vacuum laminating apparatus 12 among the outer frame parts 35 and 36, a carry-in port 37 for carrying in a laminated-molded article A which is sandwiched between the carrier films F1 and F2 but has not yet been laminated-molded by the laminating apparatus is provided. Further, on the other side, i.e., on the opposite side, of the vacuum laminating apparatus, a carry-out port 38 for carrying out the laminated-molded article A which is sandwiched between the carrier films F1 and F2 and has been laminated-molded by the laminating apparatus is provided. Although the elevating mechanism 34 is composed of a hydraulic cylinder in this embodiment, an electric motor may be used for the elevating mechanism 34 of the vacuum laminating apparatus 12, so that the elevating speed of the lower board 33 and the speed thereof at the time of contact with the outer frame part 35 of the upper board 32 may be controlled. The chamber C is connected to a vacuum pump (not shown), and the chamber C can be brought into a vacuum state by sucking the air contained in the chamber C. Note that in the present invention, the vacuum state refers to a state in which the pressure is reduced to a predetermined value.

A heat plate 39, which is heated by a heater (not shown), is attached at the center of the lower surface of the upper board 32, and an elastic sheet 40 such as a heat-resistant rubber film is attached to the surface of the heat plate 39. Meanwhile, a heat plate 41, which is heated by a heater (not shown), is also attached at the center of the upper surface of the lower board 33. Further, a diaphragm 31 made of a heat-resistant rubber film, which serves as the pressurizing body, is attached to the peripheral part of the heat plate 41 of the lower board 33 so as to cover the upper surface of the heat plate 41. Further, when pressurized air is sent to the rear surface side of the diaphragm 31 by a compressor (not shown), the diaphragm 31 bulges out inside the chamber C and thereby pressurizes the laminated-molded article A at the molding position 12*a* between it and the heat plate 39. In this embodiment, the height from the front surface 31*a* of the diaphragm 31 in the un-bulged state (including the front surface of the heat plate 41) to the upper surface 36*a* of the outer frame part 36 on the lower board 33 side is 30 mm as an example, and preferably, in a range from 10 mm to 50 mm as an example. Further, the height of the hermetically-sealed chamber C (the distance between the surface 40*a* of the heat plate 39 including the upper elastic sheet 40 and the surface 31*a* of the un-bulged diaphragm 31 of the lower heat plate 41) when the chamber C is formed is also 10 to 80 mm as an example.

Note that the diaphragm 31 of the vacuum laminating apparatus 12 may be attached to the upper board 32 and press the laminated-molded article A from the upper board 32 side. Further, the vacuum laminating apparatus 12 may be a pressing apparatus in which rubber is attached to a flat pressing surface of each of upper and lower pressurizing blocks, and one of the pressurizing blocks moves toward the other pressuring block and thereby presses the laminated-molded article A at the molding position. Further, in the vacuum laminating apparatus 12, the chamber C may be formed by independently moving only a chamber forming member, instead of moving the lower or upper board.

Drooping prevention mechanisms 18*a* and 18*b* for preventing the carrier film F1 and the laminated-molded article A from drooping in the vacuum laminating apparatus 12 are provided at an outer-side nearby position of the carry-in port 37 (i.e., a position near the outer side of the carry-in port 37) disposed on one side with respect to the molding position 12*a* of the vacuum laminating apparatus 12 and at an outer-side nearby position of the carry-out port 38 (i.e., a position near the outer side of the carry-out port 38) disposed on the other side with respect to the molding position 12*a* of the vacuum laminating apparatus 12. Note that in the present invention, the outer-side nearby position is a position on the outer side of the outer frame part 35 or 36, when it is provided, and is preferably a position closest to the outer frame part 35 or 36 without being in contact with the side surface thereof. However, the distance between the edge on the carry-out side of the drooping prevention mechanism 18*a* and the outer edge of the outer frame part 35 or 36 is, as one reference, preferably within 50 cm and within 1 m at the maximum. The drooping prevention mechanisms 18 in this embodiment are movement restraint mechanisms for restraining the movements of the carrier films F1 and F2, and are composed of a set of drooping prevention mechanisms 18*a* and 18*b*. The set of drooping prevention mechanisms 18 is attached to, separately from the vacuum laminating apparatus 12, a structural member 43 on the body side of the laminating molding system 11. More specifically, at a position below the part which the upper and lower carrier films F1 and F2 pass through, a plate-like support member 44 is fixedly provided for the structural member 43 at a position in contact with or slightly separated from the lower carrier film F2. The height of the support surface 44*a* of the support member 44 is higher than the height of the upper surface of the outer frame part 36 of the lower board 33 when the chamber is released (i.e., un-bulged), and is equal to or lower than the height of the lower surface 35*a* of the outer frame part 35 of the upper board 32. Further, the friction coefficient of the support surface 44*a* of the support member 44 is larger than that of the metal mirror surface, and may improve the friction force when it comes into contact with the carrier film F1. A ground wire (not shown) may be attached to this support member 44, or an electrostatic removal device (not shown) may be attached to the support member 44, so that the static electricity generated by the electrification of the carrier films F1 and F2 or the laminated-molded article A is removed or reduced.

Figure 2:
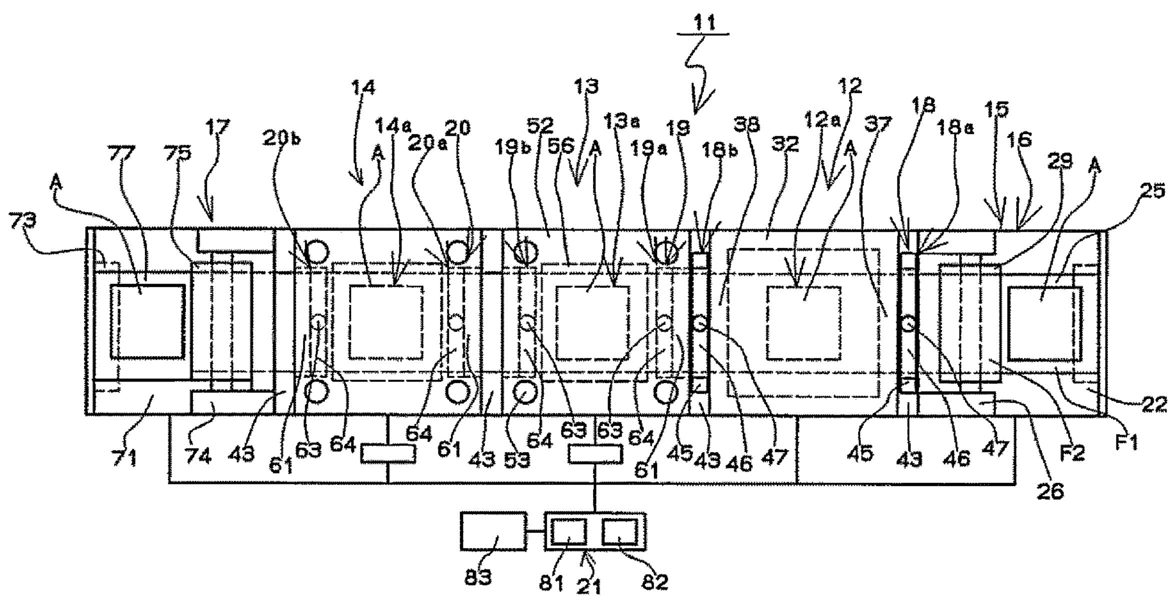
FIG. 2 is a schematic plan view of the laminating molding system according to the first embodiment.
Figure 3:
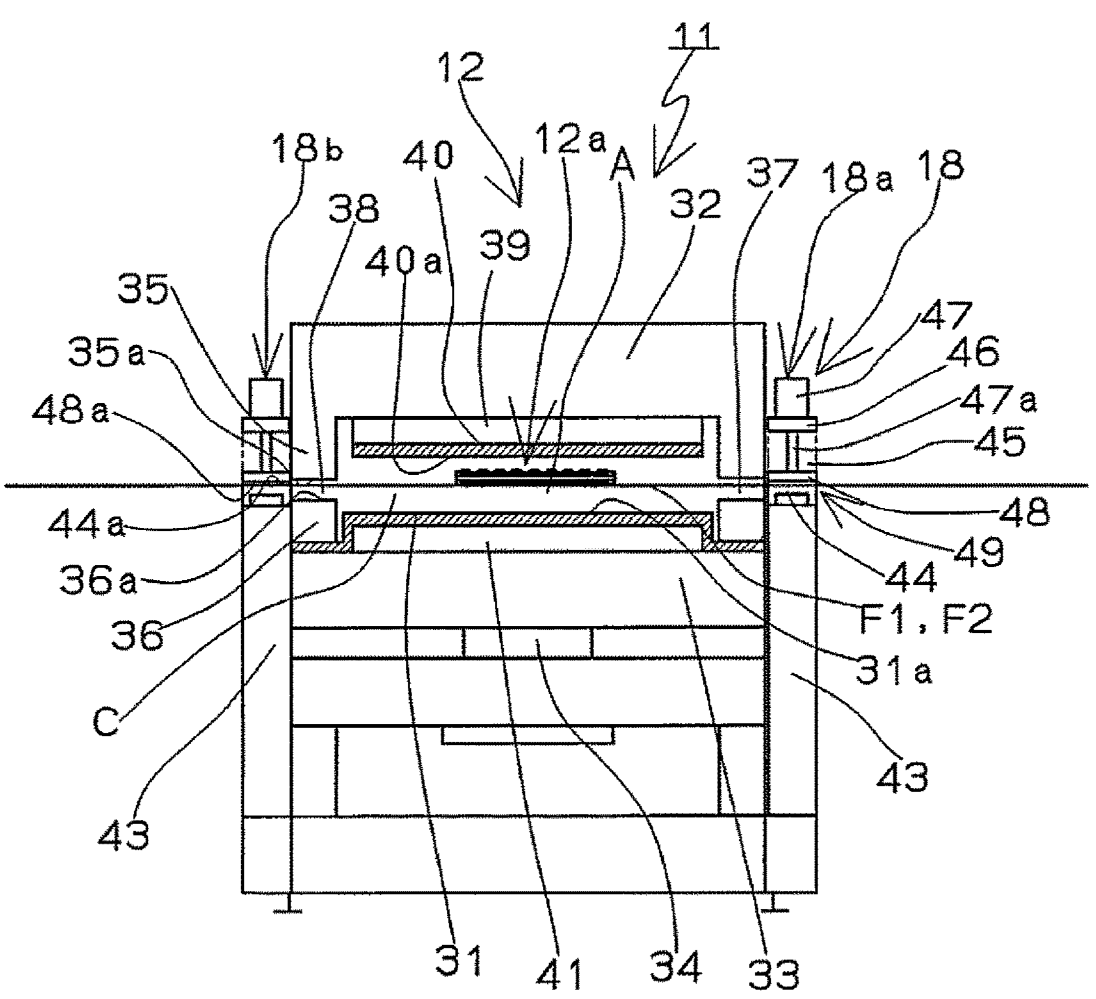
FIG. 3 is an explanatory diagram showing a state in which the laminating molding system according to the first embodiment is operating to prevent a carrier film from drooping by using a vacuum laminating apparatus and a drooping prevention mechanism.

Further, as shown in FIGS. 2 and 3, columnar members 45 and 45 are respectively formed upward from both sides of the structural member 43 which the carrier films F1 and F2 do not pass through, and the upper parts of the columnar members 45 and 45 are connected to each other by an actuator mounting member 46. Further, over the upper surface of the actuator mounting member 46, a cylinder 47, such as a hydraulic cylinder or an air cylinder, which is an actuator for the drooping prevention mechanisms 18*a* and 18*b* is provided. Note that the actuator may be driven by an electric motor. Further, a pressing member 48 for pressing the upper surface of the upper carrier film F2 is provided in a rod 47*a* of the cylinder 47. Although the pressing surface 48*a* on the lower surface side of the pressing member 48 is flat, an elastic member such as rubber may be bonded thereto to improve the friction force when it presses the carrier film F2. Both ends of the pressing member 48 are guided by a guide part provided on the inner side of the columnar members 45, and are raised and lowered relative to the support member 44 by the actuation of the actuator such as the cylinder 47. In this embodiment, a holding part 49 for holding (i.e., sandwiching) the carrier films F1 and F2 is formed by both the support member 44 and the pressing member 48.

Note that the holding part 49 of the drooping prevention mechanisms 18*a* and 18*b* may include a fixed support member on the upper side thereof, and a pressing member may be raised by an actuator provided on the lower side thereof. Further, movable pressing members may be provided above and below the carrier films F1 and F2. Further, at least one of the drooping prevention mechanisms 18 provided on one side and the other side of the laminating apparatus may be horizontally moved along the direction in which the carrier films F1 and F2 are moved. That is, the drooping prevention mechanism 18*a* provided near the outer side of the carry-in port 37 of the vacuum laminating apparatus 12 may be moved toward the preceding process after holding the carrier films F1 and F2, and the drooping prevention mechanism 18*b* provided near the outer side of the carry-out port 38 of the vacuum laminating apparatus 12 may be moved toward the subsequent process after holding the carrier films F1 and F2. In this way, the tension of the carrier films F1 and F2 in the vacuum laminating apparatus 12 sandwiched between the drooping prevention mechanisms 18*a* and 18*b* can be increased.

As shown in FIG. 2, in this embodiment, a length B in the width direction of the carrier films F1 and F2 of the pressing member 48 and the support member 44 of the holding part 49 of the drooping prevention mechanisms 18*a* and 18*b* is longer than the width of the carrier films F1 and F2, so that they can press the carrier films F1 and F2 over the entire width thereof. However, the part pressed by the pressing member 48 may be only the parts on both sides of the carrier films F1 and F2 where the laminated-molded article A is not held. In this way, even in the case where the plate-thickness of the laminated-molded article A held in the carrier films F1 and F2 is large, it is possible to reduce the distance between the support member 44 and the pressing member 48 when the laminated-molded article A passes through the drooping prevention mechanisms 18*a* and 18*b*, and thereby to quickly close the space between them.

Further, at least one of the upper and lower holding members of the holding part 49 of the drooping prevention mechanism 18 may be a roller. In this case, it is desirable that at least one of the rollers can be raised and lowered by an elevating mechanism, and that the distance between the roller and the other member or between the rollers can be adjusted. Further, when the carrier films F1 and F2 are held by reducing the distance between the roller and the other member or between the rollers, the rotation of the roller(s) may be locked. Further, the roller(s) of the drooping prevention mechanism may be rotatable by a driving mechanism. In this case, when the carrier films F1 and F2 are held by reducing the distance between the rollers, the roller(s) of the drooping prevention mechanism 18*a* near the outer side of the carry-in port 37 may be rotationally driven in the direction for pulling the carrier films F1 and F2 toward the preceding process, and the roller(s) of the drooping prevention mechanism 18*b* near the outer side of the carry-out port 38 may be rotationally driven in the direction for of pulling the carrier films F1 and F2 toward the subsequent process. In this way, the tension of the carrier films F1 and F2 in the vacuum laminating apparatus 12 may be increased.

The drooping prevention mechanism 18*b*, which is provided at the outer-side nearby position on the carry-out side with respect to the molding position 12*a* of the vacuum laminating apparatus 12 and prevents the carrier films F1 and F2 and the laminated-molded article A from drooping at the molding position 12*a* of the vacuum laminating apparatus 12, is the same as the drooping prevention mechanism 18*a* provided at the outer-side nearby position on the carry-in side with respect to the molding position 12*a*, and therefore its description will be omitted. However, regarding the shape of the pressing surface 48*a*, each of the pressing surface 48*a* of the pressing member 48 and the support surface 44*a* of the support member 44 of the drooping prevention mechanism 18*a* near the outer side of the carry-in port 37 may have such a surface shape that the carrier films F1 and F2 are less likely to slip and move toward the laminating apparatus. Further, each of the pressing surface 48*a* and the support surface 44*a* of the drooping prevention mechanism 18*b* near the outer side of the carry-out port 38 may have such a surface shape that the carrier films F1 and F2 are less likely to slip and move toward the laminating apparatus.

Note that the drooping prevention mechanisms 18, which are provided at the outer-side nearby position of the carry-in port 37 and the outer-side nearby position of the carry-out port 38 of the laminating apparatus, and prevent the carrier films F1 and F2 and the laminated-molded article A from drooping, may be directly attached to the laminating apparatus. Specifically, a bracket (not shown) is fixed in a direction from the lower board 33 of the vacuum laminating apparatus 12 toward one side, and the drooping prevention mechanism 18*a* on the carry-in port side is provided in this bracket. Further, a bracket (not shown) is fixed in a direction from the lower board 33 of the vacuum laminating apparatus 12 toward the other side, and the drooping prevention mechanism 18*b* on the carry-in port side is provided in this bracket.

Next, the first pressing apparatus 13 disposed in the in-line direction in the process subsequent to the vacuum laminating apparatus 12 will be described. In the first pressing apparatus 13, a primary laminated-molded article (laminated-molded article A) in a state where irregularities pressure-molded by the vacuum laminating apparatus 12 remain is pressure-molded into a flatter secondary laminated-molded article (laminated-molded article A) by further pressurizing at the molding position 13*a* (molding area). The first pressing apparatus 13 includes a roughly rectangular base board 51 provided in its lower part, and four tie bars 53 each vertically disposed between corresponding two of the four corners of an upper board 52, which is a roughly rectangular fixed board disposed above the base board 51. Further, in the first pressing apparatus 13, a lower board 54, which is a roughly rectangular movable board, can be raised and lowered between the base board 51 and the upper board 52. Further, the first pressing apparatus 13 uses an electric motor such as a servo motor 55 as a driving source, and a servo motor 55, which is pressurizing means, is attached to the base board 51. Note that the pressurizing means may be a hydraulic cylinder.

Pressurizing blocks 56 and 57 are attached to the opposed surfaces of the upper board 52 and the lower board 54, respectively, of the first pressing apparatus 13. Temperature control means such as a cartridge heater is provided in the pressuring blocks 56 and 57. Since the structures of the pressurizing surfaces 56*a* and 57*a* of the pressuring blocks 56 and 57 are identical to each other, only the pressure surface 56*a* of one of the pressuring blocks, i.e., the pressuring block 56, will be described. A buffer material 58 such as rubber, a resin film, or a fiber sheet is attached to the surface of the pressurizing block 56. Further, a press plate 59, which is a thin metal plate, is attached to the front surface of the buffer material 58 (opposite to the pressurizing block 56).

Further, the second pressing apparatus 14, which is disposed in the in-line direction, is disposed in the process subsequent to the first pressing apparatus 13. Since the structure of the second pressing apparatus 14 is roughly the same as that of the first pressing apparatus 13, its description is omitted here.

In this embodiment, drooping prevention mechanisms 19 (a set of mechanisms 19*a* and 19*b*), of which the purpose is the same as that of the drooping prevention mechanisms 18 of the vacuum laminating apparatus 12, are also provided in the first pressing apparatus 13, which is the laminating apparatus of the laminating molding system 11. The difference between the droop preventing mechanisms 18 of the vacuum laminating apparatus 12 and the droop preventing mechanisms 19 of the first pressing apparatus 13 and the droop preventing mechanisms 20 of the second pressing apparatus 14 is that the latter are disposed between the upper board 52 and the lower board 54 in the first pressing apparatus 13. Specifically, a bracket 61 fixed to the structural member 43 of the laminating molding system 11 extends toward space between the upper board 52 and the lower board 54 of the first pressing apparatus 13, and a support member 62 is fixed to the bracket 61. Further, a cylinder 63 of the drooping prevention mechanism 19 is attached to the lower surface of the upper board 52, and a pressing member 64 is attached to a rod of the cylinder 63. By this structure, it is possible to prevent the carrier film F1 and the like and the laminated-molded article A from drooping at the position closest to the pressuring blocks 56 and 57 constituting the molding position 13*a* of the first pressing apparatus 13. However, it is sufficient if the drooping prevention mechanisms 19 are provided near the outer-side on the carry-in side of the molding position 13*a* and near the outer side on the carry-out side thereof, or provided at a nearby position on the carry-in side on the outer side of the lower board 54 or the like of the first pressing apparatus 13 and at a nearby position on the carry-out side on the outer side of the lower board 54 or the like thereof. Further, the drooping prevention mechanisms 20 (a set of mechanisms 20*a* and 20*b*) similar to the drooping prevention mechanisms 18 of the vacuum laminating apparatus 12 are also provided in the second pressing apparatus 14.

However, in the present invention, although the drooping prevention mechanisms are essential for the vacuum laminating apparatus 12, which performs the first laminating molding (primary molding) in the laminating molding system 11, the drooping prevention mechanisms 19 and 20 are not indispensable to the first and second pressing apparatus 13 and 14, which perform the second and subsequent laminating molding (secondary molding, tertiary molding, and the like). Alternatively, one drooping prevention mechanism provided between the two preceding and subsequent laminating apparatuses may be commonly used. Specifically, one drooping prevention mechanism may be commonly used as both the drooping prevention mechanism 18*b* provided at the nearby position of the carry-out port 38 of the laminating apparatus in the preceding process (e.g., the vacuum laminating apparatus 12) and the drooping prevention mechanism 19*a* provided at the outer-side nearby position of the carry-in port of the laminating apparatus in the subsequent process (e.g., the first pressing apparatus 13).

Next, a carrier film winding apparatus 17 of the carrier film conveyance apparatuses 15 provided in the process subsequent to the second pressing apparatus 14 will be described. The carrier film winding apparatus 17 transfers the carrier films F1 and F2 and adjusts the tension thereof in cooperation with the carrier film sending apparatus 16. However, in the case where the laminated-molded article A is light, the film tension obtained by the carrier film conveyance apparatuses 15 in themselves is sufficient. However, in the case where the weight of the laminated-molded article A is, for example, 500 g or larger, the carrier films F1 and F2 (especially the lower carrier film F1 over which the laminated-molded article A is placed) may droop when the film tension is given by the carrier film conveyance apparatuses 15 alone. This tendency becomes noticeable, in particular, in the case of the laminating molding system 11 in which a plurality of laminating molding apparatuses are provided in a row.

In the carrier film winding apparatus 17, a lower body part 71 includes a winding roll 72 and a driven roller 73, and the lower carrier film F1 is wound by the winding roll 72. Further, an upper body part 74 of the carrier film winding apparatus 17 includes an upper winding roll 75 and a driven roller 76. Further, the upper carrier film F2 is detached from the laminated-molded article A at the driven roller 76, and the upper carrier film F2 is wound by the upper winding roll 75. Further, a carry-out stage part 77 of the laminated-molded article A is provided at the part where only the lower carrier film F1 is sent in a horizontal state. Note that the directions of the upper and lower carrier films F1 and F2 may be changed at the same position, and the laminated-molded article A moved to another conveyor or the like may be taken out. Further, as the transfer apparatus for the carrier films F1 and F2, a transfer apparatus that holds both sides of the carrier films F1 and F2 and pulls them toward the subsequent process (so-called a chuck apparatus) may be provided.

Next, the control apparatus 21 of the laminating molding system 11 will be described. In the laminating molding system 11, the carrier film sending apparatus 16 of the carrier film conveyance apparatuses 15, the vacuum laminating apparatus 12 and the droop preventing mechanisms 18 provided on the preceding and subsequent sides thereof, the first pressing apparatus 13 and the droop preventing mechanisms 19 provided on the preceding and subsequent sides thereof, the second pressing apparatus 14 and the droop preventing mechanisms 20 provided on the preceding and subsequent sides thereof, and the carrier film winding apparatus 17 of the carrier film conveyance apparatuses 15 are connected to the control apparatus 21. Further, the control apparatus 21 includes a sequence control unit 81, a storage unit 82, and the like, and the sequence control of the laminating molding system 11 is performed by the control apparatus 21. Further, the laminating molding system 11 includes a setting display device 83, and the setting display device 83 is connected to the control apparatus 21.

Note that it is sufficient if the laminating molding system 11 according to the present invention includes at least one laminating apparatus provided that it conveys a laminated-molded article A in the forward direction by using the carrier films F1 and F2. That is, both the first and second pressing apparatuses 13 and 14 may not be provided, or the second pressing apparatus 14 may not be provided. However, compared to the laminating molding system including only one vacuum laminating apparatus 12, in the case of the laminating molding system including the vacuum laminating apparatus 12 and the first pressing apparatus 13, or the laminating molding system including the vacuum laminating apparatus 12, the first pressing apparatus 13, and the second pressing apparatus 14, the length (feeding amount) of the carrier films F1 and F2 from the unwinding rolls 23 and 27 to the winding rolls 72 and 75 is long. Therefore, it is difficult to obtain effective tension of the carrier films F1 and F2 by the carrier film conveyance apparatuses 15 alone, so that the drooping prevention mechanisms 18, 19 and 20 of the present invention are effective. Note that in the present invention, regarding the carrier films, it is sufficient if at least the lower carrier film F1, over which a laminated-molded article A is placed and by which the article is conveyed, is provided. In the case where the upper carrier film F2 is not provided, laminating molding is performed in a state where each laminated-molded article A is covered with a cover film.

Next, a method for lamination-molding a laminated-molded article by using the laminating molding system 11 according to the first embodiment will be described with particular emphasis on the function and effect of the drooping prevention mechanism with reference to a table for explaining operations shown in FIG. 4. In the laminating molding system 11 performing continuous molding, the laminating molding is performed simultaneously in the diaphragm-type vacuum laminating apparatus 12, the first pressing apparatus 13, and the second pressing apparatus 14 in the form of a batch process under the sequence control by the control apparatus 21. However, the following description will be given along the molding sequence of a laminated-molded article A composed of a substrate and a lamination film which constitute a material to be laminated corresponding to one batch.

Both the upper and lower carrier films F1 and F2 set in the unwinding rolls 23 and 27 of the carrier film sending apparatus 16 of the laminating molding system 11 are ordinary carrier films F1 and F2, and they contain, for example, but not limited to, terephthalene terephthalate or terephthalene terephthalate as a main component. Further, although the thickness of the carrier films is not limited to this example, those of 25 μm are often used, and those of 10 μm to 100 μm are also used. Further, the tension of the carrier films F1 and F2 tensioned between the unwinding rolls 23 and 27 and the winding rolls 72 and 75 is, for example, 60 N, and preferably is in a range of about 20 N to 160 N. When the tension is lower than the aforementioned lower limit, the carrier films F1 and F2, in particular, the lower carrier film F1, droop when the laminated-molded article A is moved and when it is in a waiting state in the laminating apparatus. Further, when the tension of the carrier films F1 and F2 is higher than the upper limit, there is a possibility that a problem such as a longitudinal wrinkle in the carrier film or a slip by which only the drive shaft(s) of the unwinding rolls 23 and 27 is rotated occurs due to the insufficient strength of the aforementioned ordinary carrier films F1 and F2.

In the present invention, the drooping of the carrier film F1 refers to a state in which the lower carrier film F1 is not in close contact with the upper carrier film F2 due to the weight of the laminated-molded article A, and is a state in which the length of that part of the lower carrier film F1 is longer than that part of the upper carrier film F2. Further, when the drooping of the lower carrier film F1 becomes noticeable, and when the laminated-molded article A placed over the lower carrier film F1 is moved to one of the laminating apparatuses, the lower surface of the lower carrier film F1 comes into contact with the pressurizing surface of the heat plate or the like of the laminating apparatus. In the present invention, since it is possible to suppress the drooping state of the carrier film F1, it is also possible to, in some cases, prevent the positional deviation of the laminated-molded article A from occurring, which would otherwise be caused by wobbling of the carrier film F1 during the vacuum suction of the chamber C, in addition to preventing the molding failure, which would otherwise be caused by the contact between the aforementioned heat plate and the carrier film F1.

Further, the laminated-molded article A is typically a combination of a circuit board including irregularities, including a build-up substrate, and an insulating film, or a combination of a circuit board including irregularities and a resist film, but is not limited to these examples. Regarding the size of the laminated-molded article A, which requires the drooping prevention mechanisms 18, 19 and 20 according to the present invention, the thickness thereof is about 0.1 mm to 20 mm, and preferably 0.5 mm to 10 mm, but is not limited to these examples. Further, in the case where one laminated-molded article is molded at a time, the weight (mass) of one article is 500 g to 8 kg, but is not limited to these examples. Further, in the case where a plurality of laminated-molded articles are molded at a time, the total weight of the plurality of laminated-molded articles is in the aforementioned range. In the case of the laminated-molded article having the aforementioned weight, there is a problem that the lower carrier film F1, in particular, tends to droop downward due to the weight of the laminated-molded article A when the laminated-molded article is conveyed by the aforementioned ordinary carrier films F1 and F2 without using special carrier films. Further, in particular, when the carrier films F1 and F2 and the laminated-molded article A are carried in to the molding position between the heat plates of the laminating apparatus such as the vacuum laminating apparatus 12, the carrier films F1 and F2 become more deformed and elongated, so that they tend to droop due to the effect of the heat from the heat plate or the like which is heated to, for example, 50° C. to 200° C.

Operations performed by the laminating molding system 11 and, in particular, the drooping prevention mechanism 18 and the like will be described along an explanatory diagram showing operations performed by the laminating molding system 11 shown in FIG. 4. Although processes are successively repeated in the laminating molding system 11, a film conveyance process Pa will be first described in order to mainly explain operations performed by the drooping prevention mechanism 18 and the like. When a laminated-molded article A to be laminated-molded is newly placed over the placement stage part 25, and when the laminating molding is finished in the vacuum laminating apparatus 12 or the like and the chamber C or the like is released (e.g., opened), the winding rolls 72 and 75 of the carrier film winding apparatus 17 are rotationally driven and the carrier films F1 and F2 and the lamination product A are thereby moved from the right side (one side) to the left side (other side) in FIG. 1. Then, the laminated-molded article A which has not yet been molded is moved to the molding position 12*a* of the vacuum laminating apparatus 12, and the laminated-molded article A which has been molded by the vacuum laminating apparatus 12 is moved to the molding position 13*a* of the first pressing apparatus 13. Further, the laminated-molded article A molded by the first pressing apparatus 13 is moved to the molding position 14*a* (molding area) of the second pressing apparatus 14, and the laminated-molded article A molded by the second pressing apparatus 14 is moved to the carry-out stage part 77. Then, the carrier films F1 and F2 are stopped in a state where the tension thereof is generated by the carrier film conveyance apparatuses 15.

When the carrier films F1 and F2 move together with the laminated-molded article A, the drooping prevention mechanisms 18, 19 and 20 are stopped at the raised position (opened position) and released (e.g., opened) by the pressing member 48 and the like. When the drooping prevention mechanism 18 is in the opened position, the distance between the support member 44 and the pressing member 48 needs to be longer than a value obtained by adding the thickness of the laminated-molded article A and the thicknesses of the upper and lower carrier films F1 and F2, and is set to, for example, but not limited to, a value obtained by adding 1 mm to 15 mm to the thickness of the laminated-molded article A. In this process, by configuring the system or the like so that the support surfaces 44*a* of the support members 44 of the drooping prevention mechanisms 18*a* and 18*b* are slid while the lower surface of the lower carrier film F1 is in contact therewith, it is possible to prevent the drooping of the carrier film F1 and the laminated-molded article A even when they are moving.

Further, a carry-in port for enabling the laminated-molded article A which has not yet been molded to pass therethrough together with the carrier films F1 and F2 is provided on one side, i.e., the carry-in side, of the vacuum laminating apparatus 12. Further, the distance between the openings, i.e., between the carry-in port 37 and the carry-out port 38 (the distance between the outer frame parts 35 and 36), in which the carry-out port 38 for enabling the laminated-molded article A which has been laminated-molded to pass therethrough together with the carrier films F1 and F2 on the other side, i.e., the carry-out side, of the vacuum laminating apparatus 12 is formed, needs to be longer than a value obtained by adding the thickness of the laminated-molded article and the thicknesses of the carrier films, and is set to, for example, but not limited to, a value obtained by adding 10 mm to 25 mm to the thickness of the laminated-molded article A. The reason why the distance between the aforementioned openings of the vacuum laminating apparatus 12 should be longer than the distance between the support member 44 and the pressing member 48 of the drooping prevention mechanism 18 is as follows. That is, when the laminated-molded article A is carried in to the vacuum laminating apparatus 12 or carried out from the vacuum laminating apparatus 12, and when the laminated-molded article A comes into contact with the outer frame part 35 of the upper board 32 or the outer frame part 36 of the lower board 33 (both of which include the sealing part) through the carrier films F1 and F2, there is a possibility that the film of the laminated-molded article A may be moved off from the proper position or the molten resin is damaged because these parts are metal parts or hard rubber parts which are heated to a relatively high temperature. Further, it is necessary to prevent the laminated-molded article A from unintentionally coming into contact with any part of the vacuum laminating apparatus 12 through the carrier films F1 and F2 after the laminated-molded article A is carried in to the molding position 12*a* of the vacuum laminating apparatus 12.

Next, in a chamber closing process Pb, the lower board 33 of the vacuum laminating apparatus 12, which has been lowered after the preceding laminating molding, is raised and the carry-in port 37 on one side, i.e., the carry-in side, of the vacuum laminating apparatus 12 and the carry-out port 38 on the other side, i.e., carry-out side, are thereby closed. Further, in the first pressing apparatus 13 and the second pressing apparatus 14, the lower board 54, which is a movable board, is raised and the mold is thereby closed. However, since the distance between the openings of the carry-in port 37 and the carry-out port 38 of the vacuum laminating apparatus 12 are relatively large as described above, and when the lower board 33 is raised relative to the upper board 32 or the like of the laminating apparatus such as the vacuum laminating apparatus 12, the rising speed of the lower board 33 has to be lowered especially in the latter half of the rising process because no large impact should be given to the other board or the laminated-molded article A. Therefore, in the chamber closing process Pb, a certain length of time is required to raise the lower board 33 of the vacuum laminating apparatus 12 and thereby to close the carry-in port 37 and the carry-out port 38. Meanwhile, since the pressing member 48 of the drooping prevention mechanism 18 includes rubber over the pressing surface 48*a* and just sandwiches the carrier films F1 and F2 between it and the support member 44, its moving speed can be increased to a relatively high speed.

Therefore, in this embodiment, the drooping prevention mechanisms 18*a* and 18*b* attached at the outer-side nearby position on the carry-in side and at the outer-side nearby position on the carry-out side, respectively, of the vacuum laminating apparatus 12 are closed at the same timing as or slightly before or after the stop of the carrier film conveyance apparatuses 15 (the completion of the movement of the laminated-molded article A). Specifically, the cylinder 47 of the drooping prevention mechanism 18 of the vacuum laminating apparatus 12 is operated and the pressing member 48 and the like are thereby lowered, and the carrier films F1 and F2 are held between it and the support member 44 and the movement of the carrier films F1 and F2 is thereby prevented. In parallel with this process, the lower board 33 of the vacuum laminating apparatus 12 and the pressurizing blocks 57 of the first pressing apparatus 13 and the second pressing apparatus 14 are also raised, but they are configured so that the carrier films F1 and F2 are held between the pressing member 48 and the support member 44 before they come into contact with any of the components of the upper board or the lower carrier film F1. Then, the prevention of the movements of the carrier films F1 and F2 by the drooping prevention mechanism 18 and the like is completed in the first half of the chamber closing process Pb, and only the lower board 33 or the like is raised in the second half of the chamber closing process Pb. Then, as the outer frame part 36 of the lower board 33 and the outer frame part 35 of the upper board 32 come into contact with each other, a chamber C is formed therebetween.

Figure 6:
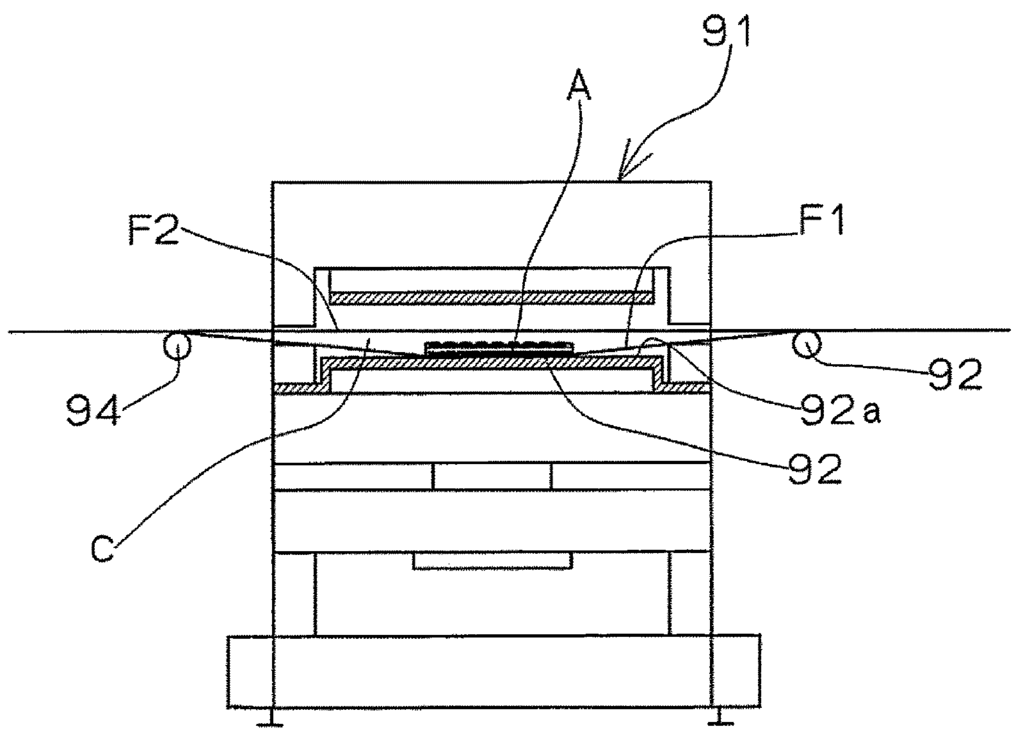
FIG. 6 is an explanatory diagram showing a drooping state of a carrier film of a vacuum laminating apparatus of a laminating molding system in a related art.

FIG. 3 shows a state in which the pressing member 48 of the drooping prevention mechanism 18 has been operated and the carrier films F1 and F2 are held between it and the support member, and the operation for preventing the drooping of the carrier films F1 and F2 and the laminated-molded article A has been performed. At least until the chamber C is formed, space is maintained between the surface 31*a* of the diaphragm 31, which is in close contact with the heat plate 41 on the lower board 33 side, and the surface of the lower carrier film F1. Since they are not in direct contact with each other, the heat from the heat plate 41 is prevented from being directly transferred to the laminated-molded article A through the lower carrier film F1. In contrast, in the related art shown in FIG. 6, since the vacuum laminating apparatus 91 includes no drooping prevention mechanism, when the weight of the laminated-molded article A exceeds, for example, 500 g in one molding process, the lower carrier film F1 may droop at a part on the inner side of the support rollers 93 and 94 in the laminating apparatus side, and the lower surface of the lower carrier film F1 and the surface 92*a* of the diaphragm 92 may come into contact with each other before the laminating molding (especially before the vacuum chamber is formed). Further, although it is not particularly limited to this example, when the weight of the laminated-molded article A exceeds 1 kg in one molding process in the laminating apparatus, in many cases, the tendency that the carrier films F1 and F2 droop becomes problematic and countermeasures thereagainst are required.

Note that when doing so, the fact that the laminated-molded article A conveyed by the carrier films F1 and F2 has passed through the drooping prevention mechanisms 18, 19 and 20 may be detected by a photoelectric tube, a proximity switch, or the like, and the actuators of the drooping prevention mechanisms 18, 19 and 20 may be operated immediately after the passage of the laminated-molded article A. By doing so, it is possible to press and hold the carrier films F1 and F2 almost at the same timing as or slightly after the laminated-molded article A reaches the molding position of the laminating apparatus, and to prevent the carrier films F1 and F2 from drooping due to the movement or sliding thereof more reliably.

Then, in the chamber closing process Pb after the drooping prevention is carried out by the drooping prevention mechanism 18, only the closing of the chamber by the rise of the lower board 33 of the vacuum laminating apparatus 12 or the like is continuously performed. Then, when the upper surface 36*a* of the outer frame part 36 of the lower board 33 and the lower surface 35*a* of the outer frame part 35 of the upper board 32 are brought into contact with each other through the carrier films F1 and F2 in the vacuum laminating apparatus 12, the rise of the lower board 33 is finished, and a subsequent laminating molding process Pc is performed. In the laminating molding process Pc, the closed chamber C of the vacuum laminating apparatus 12 is sucked into a vacuum state, and the diaphragm 31 is made to bulge out by pressurized air and the laminating molding of the laminated-molded article A is thereby performed. Further, the laminating molding is also performed between the pressurizing block 56 and the pressurizing block 57 in the first and second pressing apparatuses 13 and 14.

When the laminating molding process Pc is completed, the chamber C of the vacuum laminating apparatus 12 is opened to the atmosphere, and then the process proceeds to a chamber opening process Pd. In the chamber opening process Pd, the lower board 33 is lowered by the elevating mechanism 34, and at this point, the drooping prevention mechanism 18 and the like continue to hold the carrier films F1 and F2. Then, when the lower board 33 is completely lowered or when the distance between the carry-in port 37 and the carry-out port 38 become equal to the distance between the openings in which the carrier films F1 and F2 and the laminated-molded article A can pass therethrough even in the middle of the lowering process, the drooping prevention mechanism 18 and the like is operated and opened, and the holding of the carrier films F1 and F2 is thereby stopped. Specifically, the cylinder 47 of the drooping prevention mechanism 18 is operated and the pressing member 48 is thereby raised.

The winding rolls 72 and 75 of the carrier film conveyance apparatuses 15 are driven at the moment when or slightly after the holding of the carrier films F1 and F2 by the drooping prevention mechanism 18 and the like is finished, and the film conveyance process Pa described at the beginning is performed. As described above, in this embodiment, except when the carrier films F1 and F2 are moved, the carrier films F1 and F2 are held by the drooping prevention mechanism 18 and the like, which also serve as a movement restraint mechanism, and the movement of the carrier films F1 and F2 is restrained (including a state where the movement is completely stopped). Therefore, it is possible to prevent, in particular, the lower carrier film F1, over which the laminated-molded article A having a predetermined weight or larger is placed, from drooping at the molding position of the laminating apparatus and coming into contact with the lower molding member at an early stage. Note that the holding of the carrier films F1 and F2 by the drooping prevention mechanism 18 and the like may be suspended during the laminating molding process Pc.

Next, a laminating molding system 101 according to a second embodiment will be described with reference to FIG. 5. In the laminating molding system 101 according to the second embodiment, while the structures of the carrier film conveyance apparatuses 15, the vacuum laminating apparatus 12, the first pressing apparatus 13, and the second pressing apparatus 14 are the same as those of the laminating molding system 11 according to the first embodiment, drooping prevention mechanisms 102, 103 and 104 are different from those of the laminating molding system 11. Therefore, the same parts are represented by the same numerical numbers (or symbols), and only the differences will be described.

The laminating molding system 101 according to the second embodiment includes a block that includes a porous material 107 over the surface thereof (hereinafter referred to as a porous block 105), which serves as a movement restraint mechanism for restraining the movements of the carrier films F1 and F2, along the lower surface of the lower carrier film F1, which is moved between the driven rollers 24 and 73.

The porous block 105 disposed below the conveyance path of the lower carrier film F1 extending from the placement stage part 25 is connected to the ground or an electrostatic removal device to remove static electricity. Further, the porous block 105 itself may include a cooling apparatus and perform cooling by supplying cooling air from the suction passage through the inside of the porous material 107. Porous blocks 105*a* and 105*b* of the drooping prevention mechanism 102 are respectively provided at an outer-side nearby position on the carry-in side with respect to the molding position 12*a* of the vacuum laminating apparatus 12 and at an outer-side nearby position on the carry-out side with respect to the molding position 12*a* of the vacuum laminating apparatus 12. These porous blocks 105 may be fixed to the body part 106 of the laminating molding system 101 or may be directly attached to the laminating apparatus such as the vacuum laminating apparatus 12 through brackets or the like. Further, the rear surface side of the porous material 107 of the porous block is connected to a suction passage (not shown), and the suction passage is connected to a negative pressure generation apparatus (not shown). Alternatively, if necessary, the suction passage is also connected to a pneumatic pressure source (not shown).

Further, porous blocks 105*c* and 105*d*, which are adsorption parts of the drooping prevention mechanism 103, are respectively provided at an outer-side nearby position on the carry-in side with respect to the molding position 13*a* of the first pressing apparatus 13 and at an outer-side nearby position on the carry-out side with respect to the molding position 13*a* of the first pressing apparatus 13. Further, porous blocks 105*e* and 105*f*, which are adsorption parts of the drooping prevention mechanism 104, are respectively provided at an outer-side nearby position on the carry-in side with respect to the molding position 14*a* of the second pressing apparatus 14 and at an outer-side nearby position on the carry-out side with respect to the molding position 14*a* of the second pressing apparatus 14. The "outer-side nearby position on the carry-in side with respect to the molding position 13*a*" in the first pressing apparatus 13 may be a position closest to the pressurizing block 56 or 57 without being in contact with the side surface thereof, but may be on the outer side of the side surface of the lower board 54 or the upper board 52 of the first pressing apparatus 13. When the drooping prevention mechanism 19 is provided on the outer side, as one reference, the distance between the center of the drooping prevention mechanism 19 and the side surface of the lower board 54 or the upper board 52 is preferably within 50 cm. Further, the drooping prevention mechanism 20 of the second pressing apparatus 14 is also provided at a similar position. Note that although the drooping prevention mechanism 102 of the vacuum laminating apparatus 12 is essential, the drooping prevention mechanism 103 and 104 of the first and second pressing apparatuses 13 and 14 are not indispensable.

Further, the porous block 105 may also be provided below the lower carrier film F1 blow the conveyance path on the carry-out side extending from the last laminating apparatus or below the carry-out stage 77. In this case, the static electricity may be removed by the porous block in a manner similar to that in the preceding process. Further, a pneumatic pressure source (not shown) may be connected to the porous block 105 by air piping, and the release from the mold and the cooling are thereby improved by the ejection of air. Note that the material of the porous material 107 of the porous block 105 is not limited to the above-described examples, and porous carbon or the like may be used. By using porous carbon, it is expected that the electrification in the carrier films F1 and F2 can be removed by the carbon characteristic.

Figure 5:
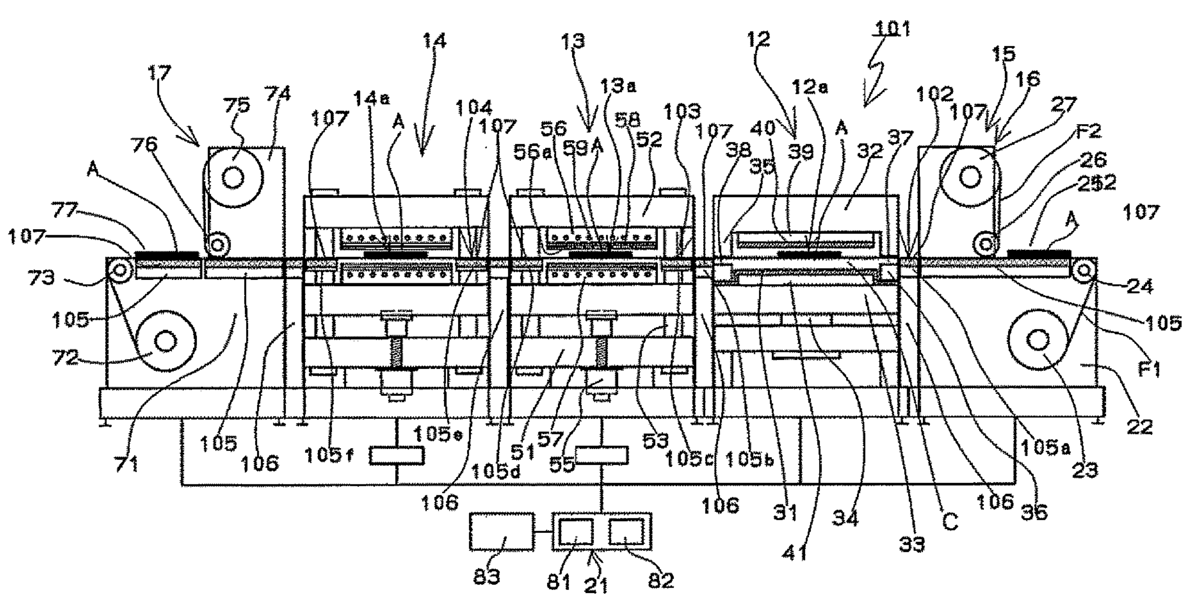
FIG. 5 is a schematic side view of a laminating molding system according to a second embodiment.

In the laminating molding system 101 according to the second embodiment shown in FIG. 5, after the carrier films F1 and F2 are moved, the lower carrier film F1 is sucked through the porous blocks 105*a* and 105*b* of the drooping prevention mechanism 102, and the drooping of the lower carrier film F1 and the laminated-molded article A at the molding position 12*a* of the vacuum laminating apparatus 12 is thereby prevented. Similarly, the lower carrier film F1 is sucked through the porous blocks 105*c* and 105*d* of the drooping prevention mechanism 103, and the drooping of the lower carrier film F1 and the laminated-molded article A at the molding position 13*a* of the first pressing apparatus 13 is thereby prevented. Further, the lower carrier film F1 is sucked through the porous blocks 105*e* and 105*f* of the drooping prevention mechanism 104, and the drooping of the lower carrier film F1 and the laminated-molded article A at the molding position 14*a* of the second pressing apparatus 14 is thereby prevented. Further, after the absorption (i.e., sucking) of the carrier films F1 and F2 is released (i.e., stopped), the carrier films F1 and F2 are moved in that state. Alternatively, after the adhering state of the carrier films F1 and F2 is finished by ejecting air from the porous blocks

105*a* and 105*b* or the like, the carrier films F1 and F2 are moved. Note that in addition to the porous block 105, a rubber sucker or the like may be used to absorb (i.e., suck) the lower carrier film F1. Further, a support member may be provided over the upper carrier film F2 side, and the absorption is performed between it and the support member.

Next, a laminating molding system and its drooping prevention mechanism according to a third embodiment will be described. The drooping prevention mechanism in the third embodiment is a carrier film deformation mechanism for deforming a carrier film, and includes a deformation mechanism part that deforms the cross-sectional shape of the carrier film. For example, the drooping prevention mechanism on the carry-in side of the laminating apparatus deforms the carrier film by applying heat and pressure. As an example, both ends of the carrier film over which no laminated-molded article is placed may be folded upward or downward in a continuous manner or over a certain distance, so that the carrier film has a U-shape in cross section. In this case, the carrier film is less likely to droop than a planar carrier film is even when a heavy object is placed thereon. Further, at least a part of the carrier film may be deformed in a convex shape, a bell shape, or a tear-drop shape by heat or a pressure. In this case, by performing the above-described deformation on a part of the carrier film other than the part thereof which is in contact with the laminated-molded article, it is possible to make the carrier film less likely to be bent or droop. Alternatively, the effect of preventing the displacement of the laminated-molded article over the carrier film can be expected.

Although all the embodiments according to the present invention are not listed one after another, the present invention is not limited to the first to third embodiments described above. Needless to say, the present invention can also be applied to those that are obtained by a person skilled in the art by modifying the above-described embodiments based on the gist of the present invention and those obtained by combining the first to third embodiments with one another.

This application is based upon and claims the benefit of priority from Japanese patent application No. 2022-041420 filed on Mar. 16, 2022, the disclosure of which is incorporated herein in its entirety by reference.

REFERENCE SIGNS LIST

11,101 LAMINATING MOLDING SYSTEM
12 VACUUM LAMINATING APPARATUS
12*a*, 13*a*, 14*a* MOLDING POSITION
13 FIRST PRESSING APPARATUS
14 SECOND PRESSING APPARATUS
15 CARRIER FILM CONVEYANCE APPARATUS
18,18A, 18B, 19, 20 DROOPING PREVENTION MECHANISM
21 CONTROL APPARATUS
37 CARRY-IN PORT
38 CARRY-OUT PORT
49 HOLDING PART
A LAMINATION-MOLDED ARTICLE
F1, F2 CARRIER FILM

The invention claimed is:

1. A laminate molding system in which an article to be laminated-molded is carried into a laminating apparatus from one side thereof by using a carrier film, and after the article is laminated-molded in the laminating apparatus, the laminated-molded article is carried out of out the laminating apparatus from another side thereof, wherein drooping prevention mechanisms configured to prevent the carrier film and the laminated-molded article from drooping at a molding position of the laminating apparatus are respectively provided at an outer-side nearby position on a carry-in side with respect to the molding position of the laminating apparatus and an outer-side nearby position on the carry-out side with respect to the molding position of the laminating apparatus, wherein the drooping prevention mechanisms are provided outside of the laminating apparatus, with a first drooping prevention mechanism being provided at the carry-in side of the laminating apparatus and a second drooping prevention mechanism being provided at the carry-out side of the laminating apparatus.

2. The laminating molding system according to claim 1, wherein the drooping prevention mechanisms are movement restraint mechanisms configured to restrain a movement of the carrier film and each comprises a holding part configured to hold the carrier film.

3. The laminating molding system according to claim 2, wherein at least one of the drooping prevention mechanisms is configured to move along a direction of movement of the carrier film.

4. The laminating molding system according to claim 1, wherein the drooping prevention mechanisms are movement restraint mechanisms configured to restrain a movement of the carrier film and each comprises an adsorption part configured to adsorb the carrier film.

5. The laminating molding system of claim 4, wherein the adsorption parts include porous materials.

6. The laminating molding system according to claim 1, wherein the drooping prevention mechanisms are carrier film deformation mechanisms configured to deform the carrier film and each comprises a deformation mechanism part configured to deform a cross-sectional shape of the carrier film.

7. The laminating molding system of claim 6, wherein the deforming of the cross-sectional shape of the carrier film is by applying pressure or heat.

8. A laminating molding method in which an article to be laminated-molded is, by using a carrier film, carried into a laminating apparatus from one side thereof, and after the article is laminated-molded in the laminating apparatus, the laminated-molded article is carried out of the laminating apparatus from another side thereof, wherein after a movement of the carrier film is restrained by operating drooping prevention mechanisms, the article to be laminated-molded is laminated-molded by forming a vacuum chamber of the laminating apparatus or by using the laminating apparatus, the drooping prevention mechanisms being provided outside of the laminating apparatus, with a first drooping prevention mechanism being provided at an outer-side nearby position on a carry-in side with respect to a molding position of the laminating apparatus, and a second drooping prevention mechanism being provided at an outer-side nearby position on the carry-out side with respect to the molding position of the laminating apparatus, the drooping prevention mechanisms being and configured to prevent the carrier film and the laminated-molded article from drooping at the molding position of the laminating apparatus.

9. The laminating molding method according to claim 8, wherein a weight of each laminated-molded article is 500 g to 8 kg.

* * * * *